United States Patent Office 3,758,392
Patented Sept. 11, 1973

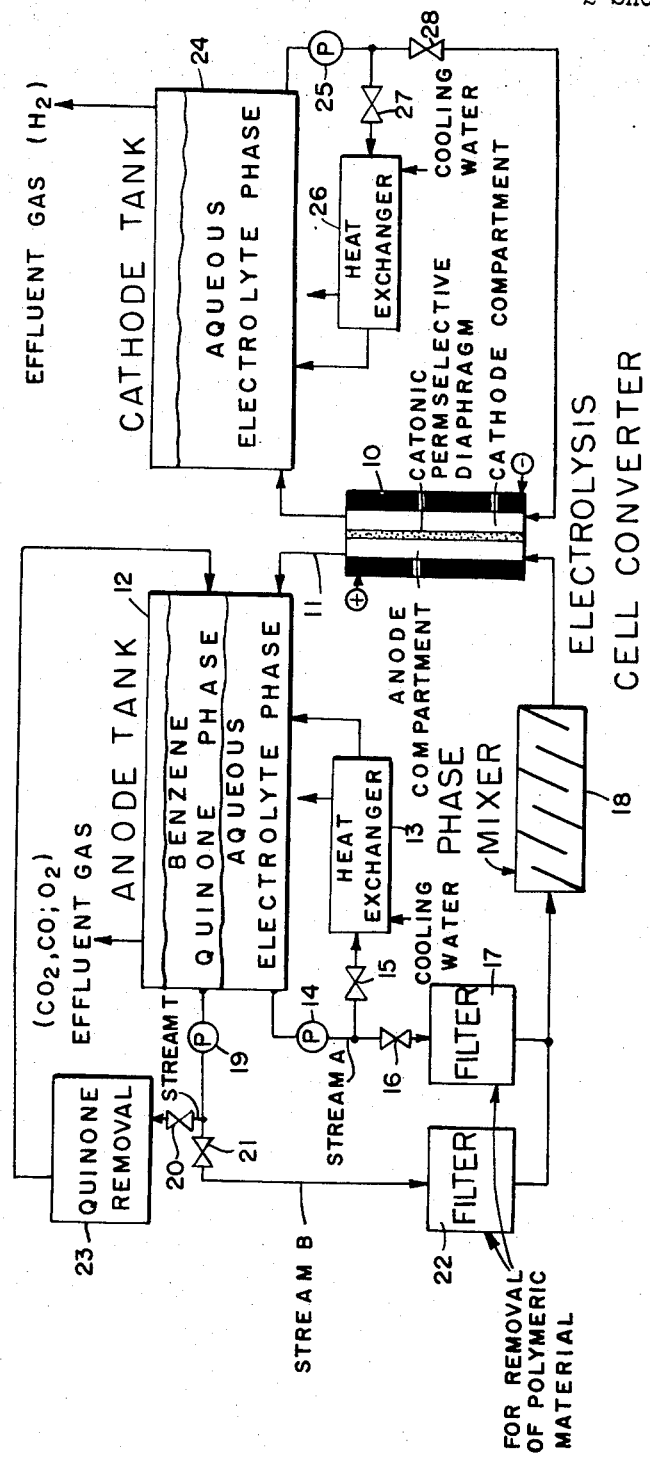
FIG. I

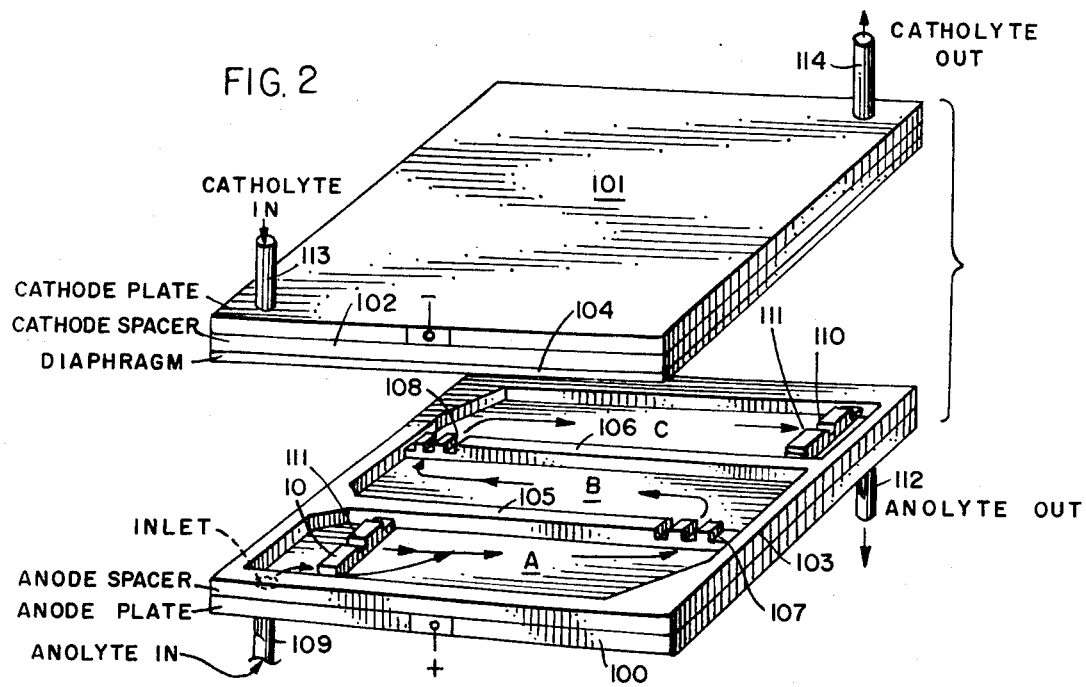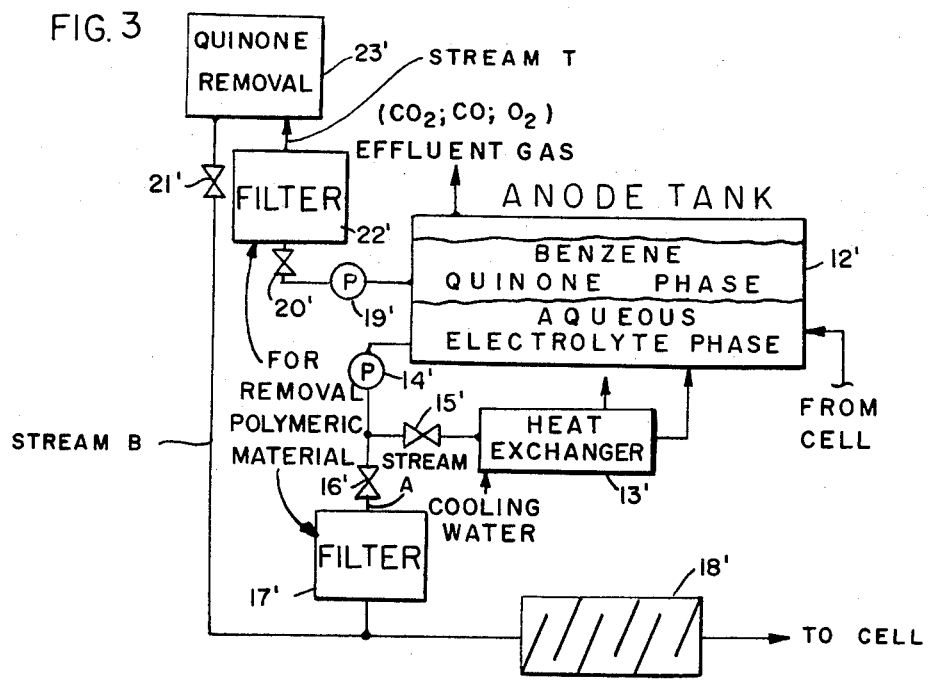

3,758,392
CONTINUOUS RECYCLE PROCESS FOR ELECTRO-
LYTIC CONVERSION OF BENZENE TO QUINONE
Fred J. Anderson, La Salle, and Jack L. Kessler, Ottawa,
Ill., assignors to Carus Corporation, La Salle, Ill.
Filed May 3, 1971, Ser. No. 139,651
Int. Cl. B01k 1/00; C07b 29/06; C07c 49/64
U.S. Cl. 204—78    2 Claims

ABSTRACT OF THE DISCLOSURE

Quinone is produced by a continuous recycle process using an electrolysis cell for anodic oxidation of benzene to quinone. During the cell oxidation, a polymeric material is formed in the anolyte dispersion of benzene and aqueous electrolyte. The polymeric material is continuously removed from the electrolysis cell with the anolyte and separated from the liquid components thereof, which are also separated and recycled to the cell, after part or all of the quinone-loaded benzene is passed through a quinone removal operation. The cells are employed with a diaphragm between the anode and cathode compartments, which is preferably a cationic permselective diaphragm.

BACKGROUND AND SUMMARY

Quinone (p-benzoquinone) is a known intermediate for the chemical synthesis of hydroquinone (1,4-dihydroxy benzene). Therefore the economic importance of quinone is based on the fact that hydroquinone is an organic chemical of major commercial importance with an estimated present annual production in the United States of 15 million pounds or more. Hydroquinone is an indispensible major ingredient in photographic developers, serves as an intermediate for many organic chemicals and dyestuffs, and is also used as an antioxidant (viz. in rubber tires), as an anti-skinning additive in paints, and as a polymerization inhibitor in the handling of monomers. Moreover, it has long been recognized that hydroquinone, with its molecular symmetry and bi-functionality, is an excellent building block in the synthesis of polymers (e.g. polyesters), especially those with high temperature resistance and other desirable properties. Since the Second World War, a large number of patents have issued pertaining to this subject, but, nevertheless, no commercial plastic incorporating hydroquinone has appeared on the market. Although such plastics have highly desirable properties, the price of hydroquinone has remained prohibitively high for such applications. It has therefore been apparent for many years that if the price of hydroquinone could be substantially reduced, the commercial utilization of hydroquinone-based plastics could be expected to develop at a rapid pace.

At present, the most widely used commercial method of making hydroquinone is based on the oxidation of aniline (with $MnO_2$ in sulphuric acid) to quinone with subsequent chemical reduction of the quinone to hydroquinone. The economics of this process are such that significant reductions in prices are unlikely. Economic limitations include high raw material and labor costs. There has therefore been an active search for alternate processes based on lower priced raw materials, and/or involving other savings in production and manufacturing costs.

There is also a potentially large market for quinone itself, if it could be produced at a lower price than at present. Surprisingly, although quinone is an intermediate in the synthesis of hydroquinone (as indicated above), the commercial price of quinone is substantially higher than that of hydroquinone. Because of the nature of the aniline process for producing hydroquinone, it is not economical to isolate the quinone intermediate. Most of the quinone on the market today is manufactured by re-oxidizing hydroquinone, which explains why quinone sells for nearly twice as much per pound as hydroquinone.

Since quinone is one of the most reactive organic chemicals, it is a potentially important starting material for a great many syntheses. Consequently, the search for lower cost processes of producing hydroquinone has also involved consideration of processes whereby the intermediate quinone can be recovered and offered as a commercial product in its own right.

For well over fifty years, it has been known that benzene can be electrolytically oxidized to p-benzoquinone. Further, this anodic oxidation of benzene has been extensively studied, both theoretically, and with the hope of practical application. [See, for example, Seyewetz and Miodon, Bul. Soc. Chim. France (4), 33 (1923), 449–456; and Udupa et al., Bul. Acad. Polonaise Sciences, IX, No. 2 (1961) pp. 45–50; and other references cited therein.] The operation of such electrolysis cells involves the evolution of oxygen at the anode and hydrogen at the cathode, which are potentially explosive when mixed. Most prior workers have therefore employed cells with the anode and cathode compartments separated by a diaphragm of porous material, the porosity of the diaphragm permitting ion transfer of electric current between the electrolyte component of the anolyte to the catholyte electrolyte. Batch-type cells were used in most of the reported experiments, but continuous or flow-through type cells have been proposed. (See German patent specifications 1,102,171 and 1,101,436, published March, 1961.)

However, the published results have not been encouraging for commercial application. As far as is known, until the present invention, no benzene oxidation process has been developed beyond the laboratory stage. Despite the fact that benzene is a low priced starting material for production of quinone (for example, as compared to aniline), the art seems to have accepted the view that processes based on the starting material have inherent limitations which preclude practical commercial utilization. In carrying forward and re-evaluating the work of Seyewetz and Miodon (cited above), Udupa et al. reached the discouraging conclusion "that the oxidation proceeds well for short durations of electrolysis only and continuation of electrolysis decreases quinone formation." [Udupa et al., cited above, p. 50 (1961).] Little if any progress is shown by the more recent literature.

U.S. Pat. 2,130,151, issued in 1938, proposes a commercial process based on the use of an open electrolysis cell (without a diaphragm) for the conversion of benzene to quinone at the anode, transfer internally of the quinone to the cathode, and cathodic reduction of quinone to hydroquinone. No commercialization is known. If carried out as described, the mixing within the electrolysis cells of the anodic oxygen with the cathodic hydrogen would appear to create a serious explosion hazard. Further, although not indicated in the patent, it may be assumed that the production of quinone and hydroquinone within an open cell will lead to their reaction, forming insoluble quinhydrone within the cell, which could cause other operational problems. The patent does mention that the anode electrolyte becomes fouled with dissolved oxidation products requiring it to be discarded, and that insoluble matter is formed in the cells requiring shutdowns for cleaning.

The process of the present invention utilizes an electrolysis cell with a diaphragm separating the anode and cathode compartment, but it is also concerned with the problems of avoiding cell fouling. For commercial use, a continuous recycle process should involve as few shutdowns for inspection, cleaning, or replacement of apparatus components as possible. However, during the experimental work leading to the present invention, it was discovered that separation and recycle of the aqueous and benzene phases of the anolyte is interfered with by a by-product contaminant. The exact chemical nature of this by-product contaminant has not yet been determined, but it has the physical characteristic of a polymeric material and is of a slimy, glutinous character. Although by operating the cells on a flow-through basis with sufficient linear velocity, this polymeric material can be carried out of the cell with the anolyte. If the material is allowed to remain in the benzene and/or aqueous recycle streams, the concentration increases to a point where the material functions as an emulsifier, and physically prevents effective separation of the aqueous and benzene phases. Further, the slimy material tends to trap the anode-produced gas, thereby also interfering with the liquid-gas separation. In accordance with the present invention, therefore, the polymeric material is preferably substantially completely removed from both the recycle aqueous electrolyte and the recycle benzene. By precluding any substantial buildup of a circulating or recycle load of the polymeric material, the oxidizing surfaces of the anodes and the anode compartment surfaces of the diaphragms are protected against fouling, as might be expected to occur by either the macroscopic or microscopic deposit of such a slimy, glutinous material. It is believed that other important advantages are also attributable to the prevention of any substantial recycle of the polymeric by-product. The polymeric material, being subject to further oxidation, would compete for cell energy and could thereby be expected to cause lowered cell efficiency. Further, since the design of the anode compartment of the cell preferably involves relatively small clearances, carrying a circulating load of the polymeric material may require greater pump pressure to achieve the same volume flow rate, and under greater pump pressure, the diaphragms, which may be relatively thin and fragile, are more subject to distortion or breakage.

In a preferred embodiment, another potential cause of cell fouling is eliminated. Although heretofore not recognized by the art, with porous diaphragms, such as diaphragms formed of clay, glass frits, etc., there can be an objectionable transfer of quinone from the anode compartment through the diaphragm's pores to the cathode compartment. Although quinone is more soluble in benzene than in water, the water phase will also contain a small amount of dissolved quinone, which can pass through the pores of the diaphragm with the water to the cathode compartment. In this way, some quinone will migrate from the anolyte to the catholyte and come in contact with the cathode, which will reduce the quinone to hydroquinone. The hydroquinone thus produced will readily dissolve in the aqueous catholyte. As the process proceeds, the amount of hydroquinone in the catholyte will build up, and it will be very difficult to provide external means for completely removing the hydroquinone. Given this situation, the hydroquinone in the catholyte can migrate into the pores of the diaphragm, where it will come in contact with quinone migrating through the diaphragm from the anolyte. Since quinone and hydroquinone react readily to form quinhydrone, which is highly insoluble in both water and benzene, considerable quinhydrone can be formed within the pore spaces of the diaphragm as an insoluble precipitate. This precipitate would therefore progressively reduce the porosity of the diaphragm, and increase its electrical resistance.

The process of the present invention preferably eliminates both potential causes of cell fouling, thereby helping to maintain cell conversion efficiencies, and preventing increases in cell voltage with greater power requirements. Fortunately, although not widely used, essentially non-porous diaphragms for electrolysis cells are available. They consist of ion exchange resins in the form of thin permselective membranes. For the purpose of the present invention, a cation exchange membrane should be employed, which is adapted to pass hydrogen ions.

In the following specification, other features of the process of this invention are set out. It should be understood that such features (viz operating conditions, electrolysis cell design, etc.) can advantageously be employed with the principal features of the process of the present invention. On the other hand, it should be understood that the basic features of the present invention can be advantageously utilized with operating conditions and procedures otherwise taught by the prior art.

DRAWING

In the following description, references will be made to the drawing, wherein—

FIG. 1 is a schematic flow diagram illustrating an embodiment of the continuous recycle process of the present invention;

FIG. 2 is an exploded perspective view of an electrolysis cell unit, which can be advantageously used in the continuous recycle process; and FIG. 3 is a schematic flow diagram showing a modification of the anolyte recycle circuit.

DETAILED DESCRIPTION

The present invention provides a continuous recycle process for conversion of benzene to quinone by anode oxidation in an electrolysis cell. The method of operation comprises continuously withdrawing from the cell an anolyte mixture contaminated with a polymeric material formed by the oxidation. The anolyte mixture will include a quinone-containing benzene phase, and an aqueous electrolyte phase. The polymeric material is separated from the liquid phases. Portions of the clarified aqueous electrolyte are recycled through the electrolysis cell, and there is mixed therewith portions of benzene substantially free of the polymeric material, and of lower quinone content than that of the withdrawn benzene phase. For continuous operation, at least part of the quinone-containing phase is transferred to a quinone recovery operation, and benzene with the major portion of the quinone removed is returned to the conversion process for admixture with the solids-free electrolyte being supplied to the cell. This may comprise the entire source of benzene for the cell (except for additions of fresh makeup benzene), or a portion of the quinone-containing benzene can be clarified to remove solids, and mixed with the solids free electrolyte together with benzene of reduced quinone content, thereby producing a benzene phase of substantially lower quinone content than the benzene phase removed from the cell.

In practicing the method of the invention, a current-transmitting diaphragm is preferably employed to separate the anode and cathode compartments of the electrolysis cells. This diaphragm can advantageously be a permselective cationic exchange membrane.

In practicing the process, the benzene to be subjected to anode oxidation is formed into a dispersion with an aqueous electrolyte, the resulting dispersion comprising the anolyte. A separate aqueous electrolyte, comprising the catholyte, continuously flows through the cathode compartment. For example, both electrolyte phase of the anolyte and the catholyte may be an aqueous acid electrolyte, and both may comprise the same acid electrolyte. From the anode compartments of the cell means, which may comprise a plurality of pairs of anode and cathode compartments arranged for parallel or series flow, there is continuously removed a four-phase mixture comprising a quinone-containing benzene phase, an aqueous electrolyte phase, a gaseous phase, and a solids phase. The gaseous phase will usually comprise a mixture of carbon dioxide and oxygen with some carbon monoxide. The solids phase is a polymeric, slimy by-product formed by the reaction. The phases are separated from each other after removal, and portions of the quinone-containing phase, with added benzene of lesser quinone content, and the aqueous acid electrolyte phase, all substantially free of gas and insolubles can be mixed to form a dispersion of recycle anolyte.

Although certain features of the recycle process of the present invention, such as the external removal of the polymeric solids, can advantageously be employed with electrolysis cells having no diaphragms, or with cells having porous as well as non-porous diaphragms, one preferred mode of practicing the present invention is with a permselective diaphragm. More specifically, the diaphragm separating the cells into separate anode and cathode compartments can consist essentially of cation exchange membranes. Where the electrolyte component of the anolyte is an aqueous acid, as preferred, the ion exchange membrane should be capable of transmitting hydrogen ions ($H^+$).

Referring now to the accompanying flow diagram designated as FIG. 1, there is shown a simplified cross-section of one cell of an electrolysis cell converter 10, which will usually include multiple cells arranged for parallel flow but in series electrically, as bipolar multiple cells of a battery. The cells can be built up sandwich fashion with each plate (except for the end plate) having an anode compartment on one side and a cathode compartment on the other, using a bipolar electrical hookup. As shown for one cell, the anode and cathode compartments are separated in sealed-apart relation by a permselective diaphragm therebetween. However, if porous diaphragms are used, such diaphragms in sheet or plate form, can be positioned in the same way. For example, glass fiber filtration mats can be employed as porous diaphragms.

Returning to the description of FIG. 1, the anode compartment of cell 10 is shown discharging into a pipe line 11 connected to an elongated tank 12. Tank 12 serves as a storage tank for the liquid phases, and also as a gas-liquid and liquid-liquid separator. The gas phase, which will usually be primarily a mixture of carbon dioxide, carbon monoxide, and oxygen, collects at the top of the tank from which it can be removed as an effluent. If desired, the effluent gas can be passed through a condenser or liquid trap to remove vaporized or entrained benzene. In tank 12, the liquid phases are allowed to separate by settling, so that the benzene phase containing the dissolved quinone collects above the higher specific gravity aqueous electrolyte, such as dilute aqueous sulphuric acid.

In the embodiment shown, the polymeric and any other insolubles produced within the anode compartments of the cell are transferred with the liquid and gas phases to the tank 12. The solids tend to follow the benzene phase, but will also be present in the aqueous phase. Both the quinone-containing benzene phase, as separated in tank 12, and the aqueous phase will therefore be contaminated with the slimy insolubles. Some of this material may collect at the interface between the benzene and aqueous phases. If desired, the coalescence of the polymeric solids and their collection at the interface can be promoted by adding surface active agents to make the insolubles less readily wet by the benzene, or to promote separation from the aqueous phase.

Portions of the acid electrolyte phase, which collects in the lower portion of tank 12 can be continuously cycled through a heat exchanger 13 by means of pump 14 for temperature control by cooling, the amount being controlled by valve 15. Pump 14 also passes portions of the aqueous phase, composing Stream A, through filter 17 to phase mixer 18. Filter 17 removes the polymeric materials and any other solids, so that Stream A, as supplied to mixer 18 is substantially free of solids. Make-up water (not shown) can be added to Stream A, as required to balance the water broken down in converter 10.

The benzene phase, containing the dissolved quinone, is withdrawn from tank 12 at an elevation above the benzene-water interface by means of pump 19. Unless the slimy solid material has been substantially completely removed from the benzene phase by settling or by some other procedure associated with tanks 12, any portions of the benzene-containing phase returned directly to converter 10 are passed through a filter 22. Other portions of the quinone loaded benzene from tank 12 can be passed by pump 19 to a quinone removal operation, as indicated generally at 23. The relative proportions of Stream B, the direct recycle stream, and Stream T, the stream transferred to quinone removal, are controlled by valves 20 and 21. Stream B is filtered at 22 to remove any polymeric material or other solids so that the benzene phase returned to converter 10 is substantially solids free. Stream T may also be filtered as it is transferred to the quinone recovery plant, or a solids separation may be included in that operation. The benzene Stream T after removal of most of the quinone therein is returned to tank 23, wherein it combines with the incoming loaded benzene from converter 10 and results in a dilution, the benzene phase mixture containing less quinone than the benzene phase from converter 10. As shown, the benzene phase (Stream B) and the aqueous electrolyte phase (Stream A) under pump pressure combine in the feed end of the phase mixer and disperser 19, and after becoming intimately mixed and dispersed therein, the resulting recycle anolyte is passed to the anode compartment (or compartments) of converter 10. For the system shown, the phase ratio of the anolyte can be expressed as the volume of Stream A divided by the volume of Stream B, while the transfer ratio is the volume of Stream T divided by the volume of Stream B. It will be understood that suitable control valves, flow meters, and control equipment will be provided to permit the phase ratio and the transfer ratio to be selectively varied and maintained at predetermined values.

Stream T through valve 20 transfers the withdrawn benzene phase to a quinone removal operation for separation of the quinone, and recovery of the benzene for further use in the electrolysis process. Since the specific recovery procedure is not part of the present invention, it is illustrated only generally in the flowsheet of FIG. 1. Depending on the quinone removal process, the returned benzene may still contain some quinone, but the amount will be substantially less than that of the benzene phase from converter 10. Fresh or make-up benzene, not previously used in the process can be added to Stream B as required.

The aqueous electrolyte, comprising the catholyte, from the anode compartments of the converter 10 is transferred to an elongated tank 24, which serves as a storage tank and a liquid-gas separator. As shown, the electrolyte (viz dilute aqueous sulphuric acid) separates from the gaseous products of the cathode electrolysis, which principally comprises hydrogen gas. The hydrogen can be removed from the top of tank 24 as an effluent gas. The aqueous electrolyte is withdrawn from the lower portion of tank 24 by means of a pump 25 for continuous circulation through a heat exchanger 26 for cooling the catholyte as required. Pump 25 also supplies the catholyte to converter 10, the flow in the cooling and cell circuits being respectively controlled by valves 27 and 28. Make-up electrolyte solution can be added when required to tank 24 or elsewhere in the circuit.

In FIG. 2, there is shown, somewhat diagrammatically, a suitable individual cell for use in practicing the method of this invention. The single cell sandwich shown for purposes of illustration, includes anode and cathode plates 100, 101. Between anode plate 100 and cathode plate 101, there are provided cathode spacer 102 and anode spacer 103. The spacers 102, 103, respectively, provide cathode and anode compartments, which are separated by diaphragm 104. Preferably, as shown, the anode compartment is in the form of a winding or tortuous passage. For example, spacer 103 can provide compartment dividers 105 and 106, which divide the anode into a series of connected spaces or channels, one end of divider 105 being provided with cross-flow passages 107, and the other end of divider 106 correspondingly provided with cross-flow passages 108. The anolyte then can be introduced through an inlet pipe 109 upstream of a baffle 110 having flow cutouts 111, and will flow through the first compartment section A, crossing to the second compartment section B through cross-flow passages 107 and then, after traversing compartment section B, will pass to compartment section C through cross-flow passages 108. After traversing compartment C, the anolyte flows through the cutouts 110' of a baffle 111' into an outlet pipe 112. It will be understood that the benzene-electrolyte dispersion will be continuously in contact with adjacent active surfaces of the anode 100, thereby effecting the anode oxidation of the benzene to quinone.

For simplicity of manufacture and to provide maximum support for the diaphragm 104, the cathode spacer 102 can be formed in the same way as the anode spacer 103, that is, with dividers, cross-flow passages, and baffles, respectively, immediately downstream of and upstream of the inlets and outlets. As shown, the catholyte can enter through an inlet pipe 113 and exit through an outlet pipe 114.

In FIG. 3, there is shown a modification of the anolyte recycle circuit of FIG. 1. For convenience of reference, the same components of the circuit have been the same numbers except that the numbers have been primed. The aqueous electrolyte phase in tank 12' circulates in the same way as in the embodiment of FIG. 1. The variation is in the circulation of the quinone-containing benzene phase, which is removed from tank 12' by a pump 19' and passed through a filter 22' for removal of solids. All of the clarified benzene phase is transferred to the quinone removal plant at 23'. After removal of at least the major portion of the quinone, the benzene of substantially reduced quinone content is transferred by means of a pump (not shown) through valve 21' to mixer 18'. As shown, the returned benzene, comprising Stream B merges with the recycled aqueous phase, comprising Stream A in the feed line to mixer 18'. The phase ratio of the anolyte will therefore be the volume of Stream A divided by the volume of Stream B. The transfer ratio is 100%, Stream T comprising all of the benzene phase from the converter. This arrangement has the advantage of minimizing the recycling of quinone formed in a previous pass through the converter. Where the quinone removal operation involves a precipitation from the benzene, such as by reacting hydroquinone therewith to form precipitated quinhydrone, the concentration of the quinone in the recycled benzene (Stream B) can be kept below 1 gram per liter, whereas the concentration of the quinone in the benzene phase after passage through the converter, will usually be at least double that amount, that is, 2 grams or more quinone per liter of benzene. To obtain this much or greater increase in quinone concentration in a single pass through the converter, the length of the flow passage through the individual cells can be increased, or the individual cells can be arranged for series flow. This may be especially required where the recovery operation removes substantially all of the quinone from the benzene, such as where the benzene is recovered by distillation.

Further information about the process of this invention is set out in the following examples.

EXAMPLE I

The anodes and cathodes can be formed from lead sheets or plates. The active surfaces of the anodes will be converted to lead dioxide ($PbO_2$) during the benzene oxidation, and will then provide a stable and active anode. Lead dioxide oxidizing surfaces can also be provided by anodes formed of lead alloys, or conductive anodes coated with lead or lead alloys. Platinum electrodes or other conductive metal or metal alloys can also be used. The cathode is essentially inactive, and the surface in contact with the catholyte will usually not be modified by the electrolysis. Lead, platinum, and other conductive metals and metal alloys can be used.

Using a sandwich cell construction, like that of FIG. 2, the spacers 102, 103 can be formed of a plastic or other material inert under the process conditions. Polypropylene or similar plastic can be used.

The diaphragm is preferably a permselective ion exchange membrane permitting the transfer of cations, such as the cation exchange membrances disclosed in U.S. Pat. 3,193,480, in col. 6. (See also U.S. Reissue Pat. 2,865.) Suitable cation-transfer membranes are sold by Ionics Incorporated, Watertown, Massachusetts, for example, Ionics Cation Exchange Membrane No. 61AZG067.

In operating the cell, a direct current voltage is applied across the anodes and cathodes. A selected current flow (amperage) is maintained with the voltage varying as required. The current density can range from 5 to 30 amp./dm.$^2$, or higher. The anode and cathode electrolyte can be aqueous sulfuric acid ($H_2SO_4$) having a concentration of from 5 to 25% w./w. Other organic or inorganic acids, such as phosphoric acid ($H_3PO_4$) can be used. In the anolyte, the volume ratio of benzene to aqueous phase can range from 0.01 to 1.0 part benzene phase per part aqueous phase. The temperature of the anolyte (in a cell) can range from 10 to 50° C. For continuous operation, the quinone concentration in the anolyte as discharged from the cell can range from 0.5 to 80 grams quinone per liter of benzene. The linear velocity of the benzene-electrolyte dispersion (the anolyte) through the anode compartment should be at least 0.1 and preferably at least 0.3 feet per second. The upper limit or linear velocity is not critical, but a typical operating range is 0.5 to 2 ft./sec.

Cell design specifications include:

| Element: | | Thickness (each) |
|---|---|---|
| Anodes/cathodes | inches | 1/8–1/4 |
| Spacers (anode/cathode compartments) | do | 1/16–1/2 |
| Diaphragm | mils | 20–50 |
| Electrode spacing (anode to cathode) | inches | 0.2–0.8 |
| Anode compartment (preferred size) | do | 0.1–0.3 |

EXAMPLE II

The process is operated as described in Example I, except that the cells of the converter are provided with porous diaphragms. In this alternative, the cation exchange membranes are replaced by porous glass, asbestos, or ceramic fiber mats having a thickness of about 1/16 to 1/8 inch. Glass fiber mat as sold for liquid filtrations are suitable. These porous diaphragms can be supported in the same way as the permselective diaphragms, that is, cathode and anode spacers, as described in reference to FIG. 2.

EXAMPLE III

A continuous recycle process is operated in accordance with the flow sheet of FIG. 3 (which otherwise is the same as the flow sheet of FIG. 1). The current density is set at 13.5 amp./dm.$^2$, and maintained within the range of 13–14 amp./dm.$^2$. The heat exchangers in the anolyte and catholyte circuits are operated to maintain an anolyte exit temperature from the cell converter of about 30° C. The phase ratio in the anolyte to the converter is 1 part by volume of the benzene phase to 4 parts by volume of the aqueous electrolyte phase. The aqueous electrolyte phase of both the anolyte and catholyte is 10% by weight sulphuric acid, that is, 10 parts by weight of sulphuric acid per 100 parts of the aqueous electrolyte solution. The pump rates in the anolyte circuit are set to give an anolyte flow rate through the converter in terms of linear velocity of 0.6 feet per second. The concentration of quinone in the benzene phase of the anolyte as supplied to the cell is approximately 0.7 gram quinone per liter of benzene. As discharged from the cell, the concentration is approximately 3 grams quinone per liter of benzene. The entire benzene phase as produced by the cell (after separation of the aqueous, gas, and solid phases therefrom) is subjected to a quinone removal operation, wherein the quinone loaded benzene is contacted with hydroquinone to form a quinhydrone precipitate, the precipitate and any excess hydroquinone being separated from the supernatant benzene by filtration. The resulting benzene containing about 0.7 grams quinone per liter of benzene is recycled to the process. As the benzene is used up, fresh or makeup benzene is added to the recycled benzene, and makeup water as required is added to the recycled aqueous electrolyte.

In the foregoing examples and with reference to the flow sheets of FIGS. 1 and 3, the polymeric solids produced in the cell oxidation are shown as being removed from the recycle streams by filtration. It will be apparent to those skilled in the art that other methods of solids removal can be utilized, such as centrifugation, decanting, coalescence and settling, etc. From a process standpoint, it is the removal of the polymeric solids from the recycle streams of the anolyte which is important, and not the specific procedure for removal, whether by filtration or by some other technique of solids removal.

What is claimed is:

1. A process for the electrolysis of benzene to quinone in electrolytic cell means providing within an enclosed zone at least one pair of spaced anodes and cathodes between which a direct current voltage is applied, said process including the steps of flowing an anolyte stream comprising a dispersion of benzene in an aqueous electrolyte through the portions of said cell means in direct contact with said anodes to form quinone in said anolyte, and simultaneously flowing a catholyte stream comprising an aqueous electrolyte through the portions of said cell means in direct contact with said cathodes, wherein the improvement comprises preventing migration of quinone from said anolyte stream to said catholyte stream by interposing an essentially non-porous but current-passing diaphragm means between said streams within each of said enclosed zones, said diaphragm means dividing said zones into sealed apart anode and cathode compartments while being effective to transfer hydrogen ions between said compartments during said electrolysis.

2. The process of claim 1 wherein said diaphragm consists essentially of a cationic permselective membrane.

References Cited

UNITED STATES PATENTS

| | | | |
|---|---|---|---|
| 729,502 | 5/1903 | Moest | 204—78 |
| 1,322,580 | 11/1919 | Kitchen | 204—78 |
| 2,285,858 | 6/1942 | Horrobin et al. | 204—78 |
| 3,663,381 | 5/1972 | Covitz et al. | 204—78 |

F. C. EDMUNDSEN, Primary Examiner